United States Patent
Hohmann et al.

(10) Patent No.: US 12,296,419 B2
(45) Date of Patent: May 13, 2025

(54) ARRANGEMENT OF A TIGHTENING DEVICE FOR A SCREW CONNECTION AND A SAFETY DEVICE

(71) Applicants: Frank Hohmann, Warstein (DE); Jörg Hohmann, Meschede (DE)

(72) Inventors: Frank Hohmann, Warstein (DE); Jörg Hohmann, Meschede (DE)

( * ) Notice: Subject to any disclaimer, the term of this patent is extended or adjusted under 35 U.S.C. 154(b) by 440 days.

(21) Appl. No.: 17/584,426

(22) Filed: Jan. 26, 2022

(65) Prior Publication Data

US 2022/0241912 A1 Aug. 4, 2022

(30) Foreign Application Priority Data

Feb. 1, 2021 (DE) ...................... 10 2021 102 230.4

(51) Int. Cl.
*B23P 19/06* (2006.01)

(52) U.S. Cl.
CPC ................................. *B23P 19/067* (2013.01)

(58) Field of Classification Search
CPC ......... B25B 13/00; B25B 13/48; B25B 23/00; B25B 23/0078; B25B 23/0085; B25B 29/02; B23P 19/06; B23P 19/067; F16B 31/04; F16B 31/043; F16B 37/0821; F01D 25/243; Y10S 411/916
See application file for complete search history.

(56) References Cited

U.S. PATENT DOCUMENTS

| 4,838,130 | A | * | 6/1989 | Snyder | B25B 21/005 |
| | | | | | 81/57.44 |
| 6,077,008 | A | | 6/2000 | Elgh | |
| 8,398,351 | B2 | * | 3/2013 | Hohmann | B25B 29/02 |
| | | | | | 411/432 |
| 9,308,632 | B2 | * | 4/2016 | Junkers | B25B 21/00 |
| 10,364,835 | B2 | | 7/2019 | Trautman et al. | |
| 2009/0162166 | A1 | | 6/2009 | Hohmann et al. | |
| 2013/0074315 | A1 | * | 3/2013 | Slocum | B25B 23/0085 |
| | | | | | 81/58 |
| 2019/0120275 | A1 | * | 4/2019 | Junkers | F16B 43/00 |

FOREIGN PATENT DOCUMENTS

| EP | 3769904 | * | 1/2021 | |
| EP | 3769904 | A1 * | 1/2021 | B23P 19/06 |

* cited by examiner

*Primary Examiner* — Robert J Scruggs
(74) *Attorney, Agent, or Firm* — Gudrun E. Huckett

(57) ABSTRACT

A tightening device for a screw connection and a safety device assigned to the tightening device are provided. The screw connection has a bolt and a nut resting on a support surface. The tightening device has a cylinder housing, a hydraulically driven piston arranged in the cylinder housing and moveable along an axis, an exchangeable bush which can be carried on the axis and screwed to the threaded bolt, and a carrier connectable to the threaded nut by force fit or form fit. To prevent jumping of the tightening device on breakage of the bolt, the safety device has a threaded sleeve and a protective arm. The threaded sleeve is arranged outside the cylinder housing and has an internal thread for engaging a threaded bolt adjacent to the bolt. The protective arm is attached to the threaded sleeve and extends over the cylinder housing of the tightening device.

11 Claims, 3 Drawing Sheets

ARRANGEMENT OF A TIGHTENING DEVICE FOR A SCREW CONNECTION AND A SAFETY DEVICE

BACKGROUND OF THE INVENTION

The invention concerns an arrangement of a tightening device for a screw connection and a safety device assigned to the tightening device, wherein the screw connection comprises a threaded bolt and a threaded nut resting on a support surface, and wherein the tightening device comprises at least

- a support tube surrounding the threaded nut and resting against the support surface,
- a cylinder housing arranged in the extension of the support tube,
- a hydraulically driven piston which is arranged in the cylinder housing so as to be moveable along an axis,
- an exchangeable bush which can be carried by a piston on the axis and is provided with an internal thread for screwing the exchangeable bush to the threaded bolt,
- a carrier which is arranged rotatably in the support tube and can be connected to the threaded nut by force fit or form fit.

When tightening screw connections with a tightening device which acts purely axially, the threaded bolts are loaded with very high forces acting in the axial direction. Today, forces are applied which briefly load the material of the threaded part up to its elastic limit. A 90-98% use of the rated tensile stress is the norm for many tightening processes. In some cases, it is already being considered to preload threaded bolts beyond the recommended tensile stress.

Despite constantly improved manufacturing possibilities and an associated increase in quality of the threaded bolts, nonetheless during screwing processes with axial tightening devices, threaded bolts can break or snap unexpectedly in rare cases. This may be due to various reasons, for example, inadequate material properties of the screw material, cracks, faults in the coating process, and corrosion.

Furthermore, the threaded bolt can also break if the exchangeable bush is not screwed sufficiently far onto the bolt to be tightened during assembly. This results from an inadequate thread overlap between the threaded bolt and the exchangeable bush.

In such a case, the energy of the screw connection, stored until the time of failure, abruptly discharges. Depending on the amount of force applied and the composition of the screw connection, the tightening device can thereby be thrown over several meters. If persons are hit by the usually heavy tool, there is a risk of life-threatening injury. Fitters should keep a sufficiently large safety distance during the buildup of pressure in the tightening device, but this is not always possible for various reasons. Also, the "flight direction" of the tool cannot be predicted exactly.

Protective devices which stop an axially acting tightening device from jumping on breakage of the threaded bolt are well known. Thus, for example, US 2009/0162166 describes a nut for screw connections which is composed, in the circumferential direction, of equal-sized nut halves which abut one another in separating planes and are guided so as to be movable relative to one another between an open and a closed position. The nut halves are pivotable relative to one another and are pivotally connected together for this purpose in a first end region. A lever is used to move the nut halves together into the closed position.

The nut is secured on a threaded bolt adjacent to the threaded bolt to be tightened, and is connected to the tightening device by a break-resistant strap. The length of the strap is as short as possible in order to keep the potential travel small on breakage of the threaded bolt to be screwed and an associated jumping of the tightening device.

The disadvantage with the proposal in US 2009/0162166 is that, although restricted, jumping of the tightening device is still possible on breakage of the threaded bolt to be tightened. If a fitter has not maintained the prescribed distance, there is still a high risk of injury. To make matters worse, because of the connection of the tightening device to the nut, in the case of breakage, the tightening device can execute an uncontrolled movement with high risk of injury.

To avoid jumping of the tightening device, in practice it is necessary to screw a further additional nut onto a further threaded bolt which sits adjacent to the other side of the tightening device. This nut is also connected to the tightening device by its own strap. This entails a substantial additional installation complexity, since a nut must be attached on both sides of the tightening device and connected to the tightening device by a strap.

The object of the invention is to refine the arrangement of a tightening device and a safety device such that an unintentional jumping of the tightening device in the case of breakage of the threaded bolt to be tightened is prevented, wherein the assembly complexity associated with the arrangement of tightening device and safety device remains low.

SUMMARY OF THE INVENTION

This object is achieved with an arrangement comprised of a tightening device and a safety device with the features specified above, wherein components of the safety device are a threaded sleeve and a protective arm, wherein the threaded sleeve is arranged outside the cylinder housing and the support tube and is configured with an internal thread for engagement on a threaded bolt of another screw connection adjacent to the threaded bolt, and wherein the protective arm is attached to the threaded sleeve and extends over the cylinder housing of the tightening device.

In other words, the safety device is configured to prevent an uncontrollable jumping of the tightening device in that it is fixed to a threaded bolt adjacent to the threaded bolt to be screwed, and in that the protective arm extends preferably over the end face of the cylinder housing facing away from the support tube. It is preferred that the protective arm extends completely over the end face of the cylinder housing facing away from the support tube.

Firstly, the tightening device is installed as usual on the threaded bolt to be tightened, and prepared in the usual fashion. Then the threaded sleeve of the safety device is attached to the threaded bolt of another adjacent screw connection such that the protective arm of the safety device extends over the cylinder housing of the tightening device.

At least the protective arm of the safety device protrudes so far over the cylinder housing that the protective arm reaches up to the peripheral contour of the cylinder housing. Preferably however, the protective arm is of such a length that it reaches far over the cylinder housing, preferably even over the entire peripheral contour of the cylinder housing.

The threaded sleeve is, for example, an elongate sleeve with at least one end at which an internal thread is located. The internal thread is complementary to the corresponding threaded bolt and is screwed onto the threaded bolt adjacent to the tightening device, or alternatively pressed onto its thread by form fit.

According to one embodiment, the threaded sleeve comprises at least two segments which abut one another in a separating plane and are guided so as to be movable relative to one another between an open position and a closed position, and which establish the threaded sleeve in a locked position on the threaded bolt or release it in a released position. The segments are mounted pivotably on the threaded sleeve with their side facing away from the threaded bolt, wherein in case of two such segments, the pivot axes run parallel to one another.

Preferably, the at least two segments guided movably relative to one another, in the locked position or in the released position, are locked by a ring which is movable in the direction of the longitudinal axis of the threaded sleeve.

It is however also possible to provide a greater number of segments, for example, three segments, wherein the position of their pivot axes are then adapted to one another according to their number.

The advantage of this embodiment of the threaded sleeve is that it avoids a time-consuming screwing onto a threaded bolt, and merely an engagement of the threaded sleeve on the threaded bolt is required. This is achieved by manually pushing or pressing on. To remove the threaded sleeve from the threaded bolt, the ring is transferred to the released position so that the segments can be spread open again and release the threaded bolt.

In order to still have access to the end face of the cylinder housing and components arranged therein after installation of the safety device, despite the protective arm extending over the end face of the cylinder housing, the protective arm preferably has an opening which exposes, i.e., clears, a drive portion of the tightening device located underneath.

Preferably, a form-fit plate, which is adapted in its shape to the end face of the cylinder housing, is also arranged on the protective arm on the tightening device side. Positioning the form-fit plate opposite the end face of the cylinder housing creates a type of form-fit connection to the cylinder housing. The complementary structures may achieve a degree of fixing in the horizontal direction, as well as a degree of vertical fixing by adaptation of the shape of the form-fit plate to the shape of the end face of the tightening device.

Preferably, the form-fit plate extends over the entire end face, wherein in an alternative embodiment, the form-fit plate extends preferably only over part of the end face.

In order to gain access to important operating elements such as, for example, the drive portion in the cylinder housing despite the form-fit plate, the form-fit plate preferably has an opening aligning with the opening of the protective arm.

In practice, often a plurality of screw connections to be tightened or retightened in sequence are arranged along a ring flange. The structure of all these screw connections is identical, and often their screw axes have identical spacings from one another.

However, in other flange connections, the mutual spacing of the screw connections may differ. Within a flange connection, the spacings may also have an admittedly small but perceptible variance. In order to be able to use the arrangement of tightening device and safety device even in the case of threaded bolts with different mutual spacings, the protective arm may be attached to the threaded sleeve so as to be adjustable transversely to the axis of the cylinder housing. Thus, depending on the screwing situation, the distance between the tightening device and the threaded sleeve may be adapted according to the spacing of the threaded bolts.

On the threaded sleeve side, the protective arm is, for example, configured with a slot which extends from the threaded sleeve in the direction of the tightening device. Preferably, the threaded sleeve has a circumferential groove for receiving the protective arm in a transversely movable fashion, wherein the threaded sleeve is mounted in the protective arm via the groove so as to be rotationally movable. Thus, the threaded sleeve is received in the groove of the protective arm so as to be movable along its longitudinal axis in the fashion of a loose bearing.

The threaded sleeve may be configured so as to be rotatable about its axis relative to the protective arm. This allows centering of the form-fit plate to the end face of the cylinder housing on simultaneous screwing of the threaded sleeve to the adjacent threaded bolt.

On breakage of the threaded bolt loaded by the tightening device, the kinetic energy of the tightening device, which is suddenly released from the break, is transmitted via the form-fit plate and protective arm into the threaded sleeve on the adjacent threaded bolt. Since, preferably, the protective arm and/or the form-fit plate have a bending strength which is lower than that of the threaded sleeve, the protective arm and/or the form-fit plate deforms under the impulse, whereby the tightening device, the adjacent threaded bolt or threaded sleeve are protected.

The adjacent threaded bolt is the one directly next to or one which is not directly next to the threaded bolt on which the tightening device is mounted. Also, the threaded sleeve may be installed on the next but one threaded bolt, wherein the length of the protective arm should be adapted accordingly. The increased distance between the tightening device and the threaded sleeve, and the associated extension of the protective arm, has the positive effect that the protective sleeve can absorb significantly more kinetic energy in the form of deformation in comparison with a shorter protective arm. Thus, the risk of potential damage to the tightening device, threaded sleeve, and threaded bolt on which the threaded sleeve is positioned, is reduced.

Preferably, the groove is formed partly by the threaded sleeve and partly by an end piece attached to an end of the threaded sleeve on the protective arm side, wherein the end piece is removably attached to the threaded sleeve.

After a breakage of the threaded bolt and the resulting deformation of the protective arm, and in some cases also of the form-fit plate, the end piece is removed from the threaded sleeve and the deformed protective arm can be replaced by a new non-deformed protective arm.

It is however also conceivable that the protective arm, form-fit plate and threaded sleeve have an identical or at least comparable bending strength. Thus, where applicable, the entire safety device would deform in the case of breakage of the threaded bolt and would have to be replaced as a whole.

BRIEF DESCRIPTION OF THE DRAWINGS

Further measures are explained below together with the description of two preferred exemplary embodiments of the invention shown in the figures.

DESCRIPTION OF PREFERRED EMBODIMENTS

Figure 1:
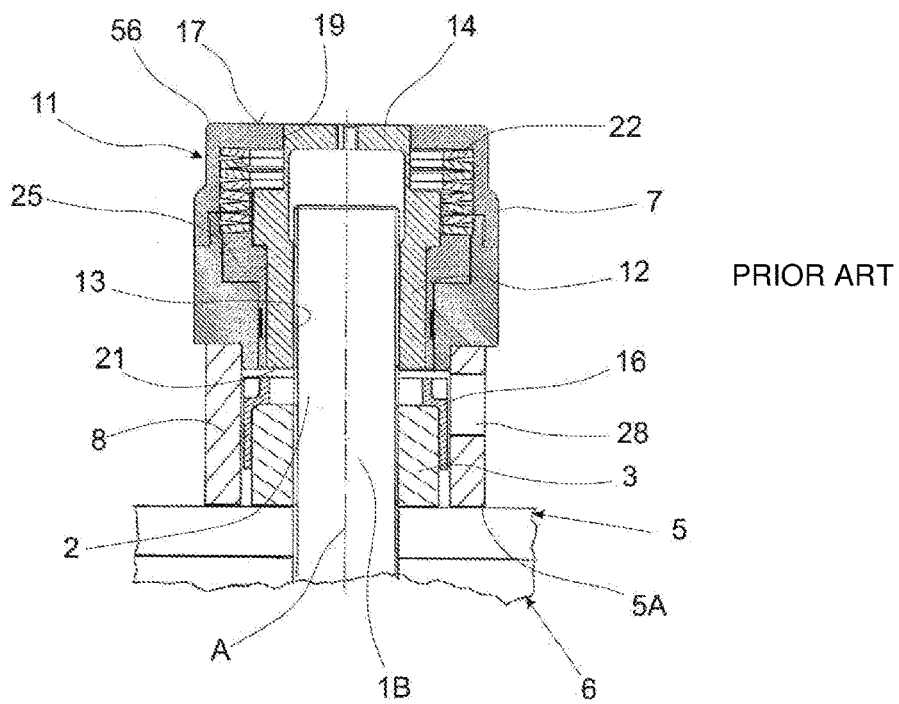
FIG. 1 shows a schematic cross-section through a tightening device known from the prior art.
Figure 2:
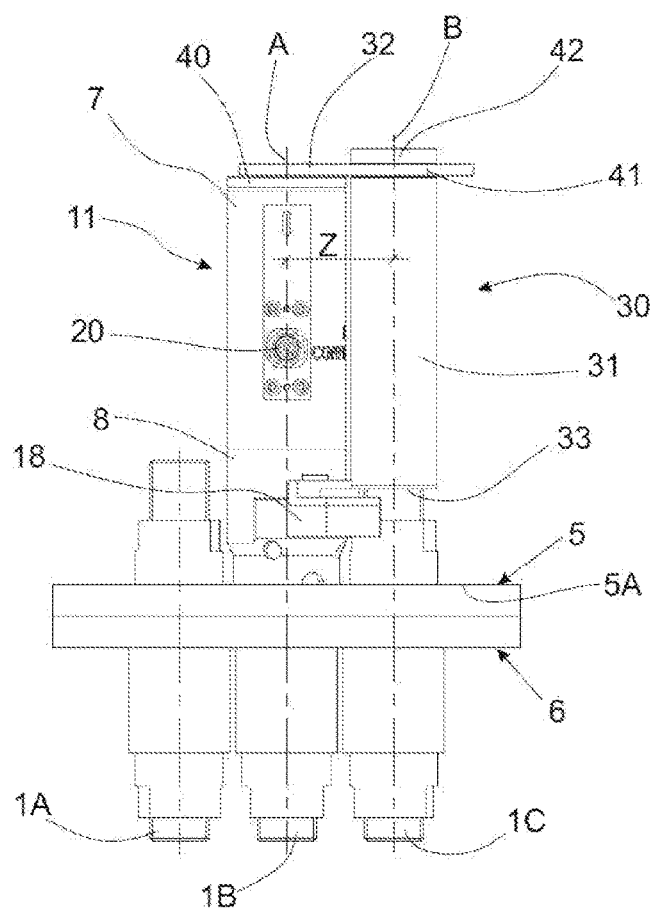
FIG. 2 shows a front view of the tightening device and a safety device in the state installed on the threaded bolt.
Figure 3:
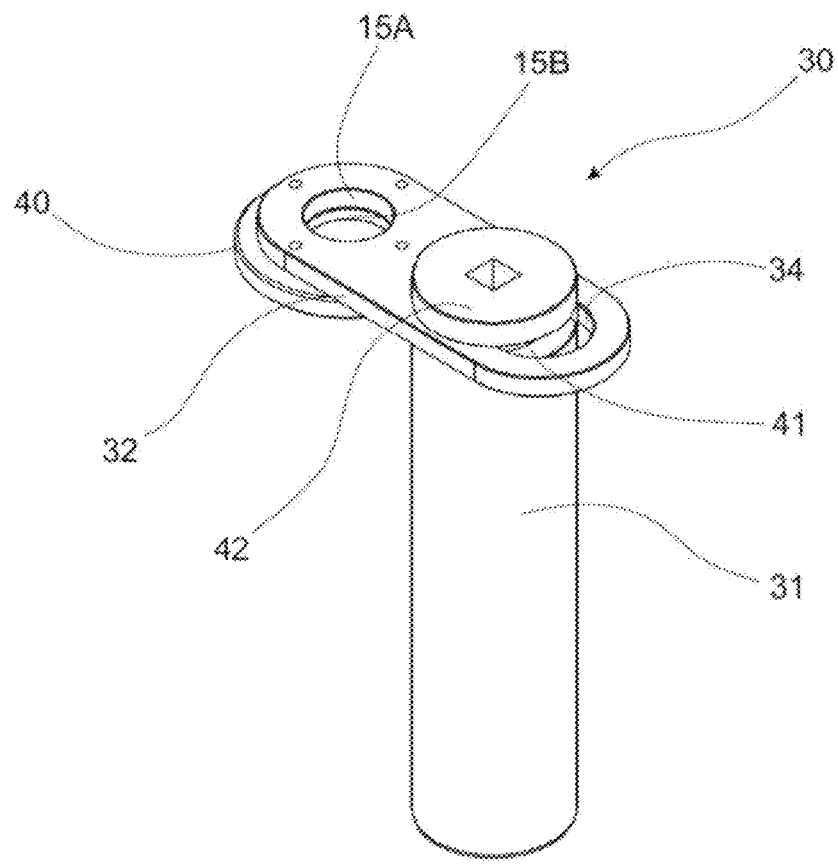
FIG. 3 shows a perspective view of the safety device.

According to FIGS. 1 and 2, several screw connections each comprise threaded bolts 1A, 1B, 1C, which, for example, are comprised of a widened bolt head, a shank portion, and a threaded portion, and a threaded nut 3 screwed onto the threaded portion of the respective threaded bolt 1A, 1B, 1C. The screw connections arranged in line serve to clamp fixedly together two machine or plant parts, which in FIG. 1 are two ring flanges 5, 6 resting flat against one another. The nut 3 of the screw connection here rests on the outside of the ring flange 5 as a support surface 5A.

Aside from the threaded bolts 1A, 1B, 1C and the respective threaded nuts 3 screwed thereon, further elements may form part of the screw connection, for example, a further threaded nut on the side of the ring flange 5, 6 to be clamped facing away from the threaded nut 3. Additional washers or rings may also be used between the nut 3 and the support surface 5A as part of the respective screw connection.

By means of a tightening device 11, each of the screw connections, for example, in FIG. 2 the middle one of the three screw connections shown, will be stretched in the screw longitudinal direction, i.e., lengthened, under application of an exclusively axial tensile force. The threaded bolt 1B is thus stretched by axial tension on the thread end portion 2 of the threaded bolt 1B protruding beyond the threaded nut 3. This elongation concerns above all the shank and the threaded portion of the threaded bolt 1B. The tightening force applied and/or the tightening pressure applied by means of a corresponding hydraulic system may be recorded automatically in a documentation module when a control and analysis unit is used, and thus be available for later test purposes.

While a predefined preload force is applied to the threaded bolt 1B for a specific time due to activation of the tightening device 11, the threaded nut 3 can be tightened or re-tightened. The so-called counter-turning of the nut 3 takes place either by means of an electromotor drive or manually using a suitable hand tool, for example, a multisided socket with or without integrated ratchet mechanism. The tightening torque actually applied for counter-turning the nut 3 can also be recorded automatically in the documentation module.

An exchangeable bush 12, arranged centrally and longitudinally movably in a cylinder housing 7 of the tightening device 11, is provided with an internal thread 13 at one end. By means of the internal thread 13, the exchangeable bush 12 is screwed onto the thread end portion 2 of the threaded bolt 1B protruding beyond the nut 3. This screwing on action may in some cases take place using the above-mentioned tool, for which, at its other end facing away from the support surface 5A, the exchangeable bush 12 is provided with a drive portion 14 arranged on or in the outer end face 17 of the cylinder housing 7. The drive portion 14 is fitted with a multisided piece on which the tool can be applied for turning the exchangeable bush 12.

During the tightening process, the exchangeable bush 12 screwed onto the respective threaded bolt 1B is placed under axial tension by means of strong hydraulic pressure, whereby the threaded bolt 1B is stretched in its longitudinal direction. Accordingly, the underside of the nut 3 comes free from the support surface 5A. In this state, the nut 3 can be turned with relatively little resistance and counter-turned until it achieves a new gap-free contact against the support surface 5A, for example, by means of the hand tool described.

This turning or pivot movement can be transferred into a rotational movement of the threaded nut 3 via an interposed gear mechanism 18 shown in FIG. 2.

The indirect turning of the nut 3 takes place via a carrier 16 mounted in a support tube 8 of the tightening device 11. In the embodiment described here, the carrier 16 is a rotary sleeve which surrounds the nut 3 and is provided on its inside with form-fit structures, and in particular with a hexagonal piece which surrounds by form fit the hexagonal piece formed on the nut 3.

The carrier or the rotary sleeve 16 is driven by means of the gear mechanism 18 which is situated largely in a drive housing on the outside of the support tube 8 of the tightening device 11. For turning the rotary sleeve 16, the support tube 8 has an opening 28 on the region of its periphery at which the drive housing with gear mechanism 18 is situated. The rotary sleeve 16 is therefore driven through the opening 28. The gear mechanism 18 together with the rotary sleeve 16 forms the device for counter-turning the nut 3. The nut 3 may naturally be counter-turned suitably only for the duration of axial stretching of the threaded bolt 1B.

The hydraulic tightening mechanism is surrounded by the pressure-resistant cylinder housing 7. Its rigid extension downward forms the support tube 8 surrounding the threaded nut 3. The support tube 8 may be integral with the cylinder housing 7 or be a component separate from the cylinder housing 7, for example, attached thereto. The support tube 8 is open at the bottom and rests with its annular underside on the fixed support surface 5A on which the underside of the nut 3 also rests.

On the cylinder housing 7 is a hydraulic connection 20, via which a hydraulic working chamber 21 is connected under valve control to an external hydraulic supply, for example, a hydraulic pump. A piston 25 is arranged in the cylinder housing 7 and sealed against the cylinder inner wall. The piston 25 is arranged in the cylinder housing 7 so as to be longitudinally movable along the axis A of the threaded bolt 1B. By feeding hydraulic pressure medium into the hydraulic working chamber 21, the piston 25 is lifted. This may take place for example against the force of the spring 22 loading the piston 25 from above and serving as the piston return spring, which aims to keep the piston 25 in its base position in which the hydraulic working chamber 21 has a minimum volume.

The piston 25 is shaped like a ring and coaxially surrounds the exchangeable bush 12. On its inner edge, the piston 25 has a shoulder or step which, facing away from the support surface 5A, forms a carrier face on which the exchangeable bush 12 rests. When the hydraulic pump feeds pressurized fluid into the working chamber 21, the piston 25 is lifted and carries the exchangeable bush 12 with it in the longitudinal direction. Thus, the threaded bolt 1B is stretched longitudinally along axis A.

At its end facing the bolt, the exchangeable bush 12 has an internal thread 13 for screwing onto the respective end portion 2 of the threaded bolt 1B. At its other end, the exchangeable bush 12 is provided with the drive portion 14, via which the exchangeable bush 12 can be rotated during preparation for the tightening process, and thereby screwed onto the end portion 2 of the threaded bolt 1B.

The drive portion 14 is accessible through an end face opening 19 in the cylinder housing 7, for example, for the hand tool described above, for the purpose of screwing the exchangeable bush 12 onto the thread end portion 2.

When the tightening device 11 is already fixedly installed on the threaded bolt 1B, and before the tightening process, a safety device 30, which comprises a threaded sleeve 31 with a protective arm 32, is then screwed onto a threaded bolt adjacent to the tightening device 11. This adjacent threaded bolt is here the threaded bolt 1C.

The threaded sleeve 31 is comprised of an elongate cylindrical body with a continuous bore. At the flange-side end of the cylinder, an internal thread 33 is formed in the passage bore. This is complementary to the external threads of the threaded bolts 1A, 1B, 1C and can therefore be screwed onto these bolts.

Figure 4:
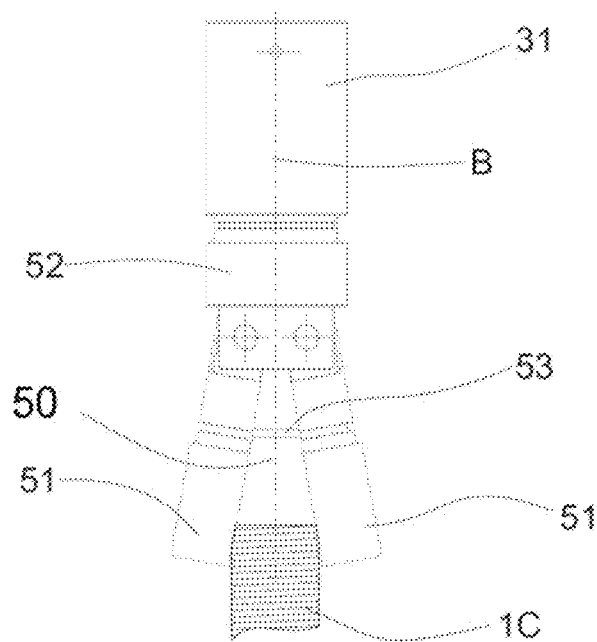
FIG. 4 shows a front view of the threaded sleeve with spread-apart segments according to a second embodiment.
Figure 5:
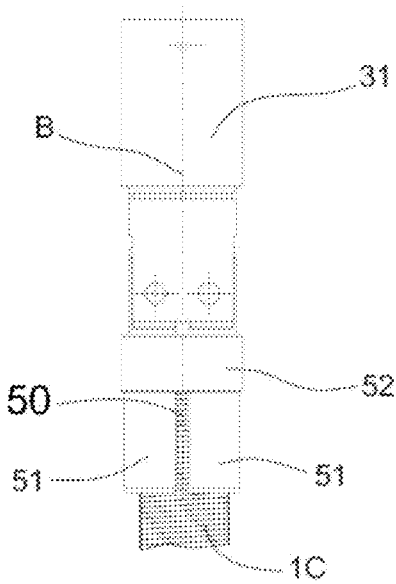
FIG. 5 shows a front view of the threaded sleeve with closed segments according to the second embodiment.

FIGS. 4 and 5 show a second embodiment of the threaded sleeve 31, here in a multipiece form. At its end facing away from the protective arm 32, the threaded sleeve 31 has two segments 51 which are each pivotally mounted by their upper end on the end of the threaded sleeve 31 facing the protective arm 32. The two segments 51 are each formed with their inside complementary to a respective half of the threaded bolt 1C. In order to ensure a first locking of the segments 51 on the threaded bolt 1C, the two segments 51 are connected together by a spring element 53 which forces the two segments 51 towards one another into a closed position. This means that, when the threaded sleeve 31 is pressed onto a threaded bolt 1C adjacent to that occupied by the tightening device 11, the segments 51 initially spread open. When the threaded sleeve 31 reaches the position suitable for the locking position, the segments 51 are pulled together again and form a form-fit connection with the threaded bolt 1C in that they lie by form fit around the threaded bolt 1C.

In order to secure the form-fit engagement between the segments 51 of the threaded sleeve 31 and the thread of the threaded bolt 1C, according to FIG. 5, an axially movable ring 52 is pushed by the upper one-piece threaded sleeve 31 onto the segments 51 which are now aligned therewith in closed state. Thus, the spreading and associated loss of engagement of the threaded sleeve 31 on the threaded bolt 1C are now blocked and thus prevented.

At the end of the threaded sleeve 31 facing away from the threaded bolt 1C, a protective arm 32 is attached or mounted. The protective arm 32 extends over the tightening device 11 and lies indirectly on the end face 17 of the cylinder housing 7. On the tightening device side, towards the end face 17 of the cylinder housing 7, a form-fit plate 40 is attached to the protective arm 32, wherein the form-fit plate 40 is lowered more and more onto the end face 17 of the cylinder housing 7 as the threaded sleeve 31 is screwed onto the threaded bolt 1C.

Figure 6:
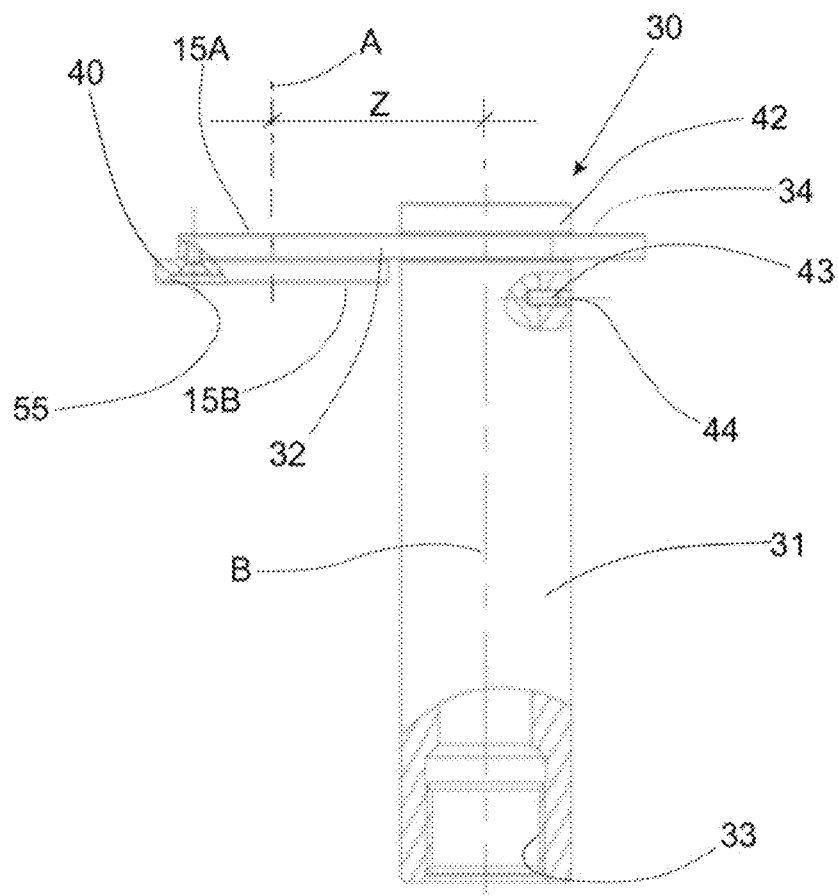
FIG. 6 shows a partial sectional view of the safety device.

According to FIG. 6, on its side facing the tightening device 11, the form-fit plate 40 has a circumferential conical region 55 which is formed so as to be complementary to a circumferential chamfer 56 (see FIG. 1) on the end face 17 of the cylinder housing 7. Therefore, when the form-fit plate 40 is laid on the end face 17 of the cylinder housing 7, a form fit is created between the cylinder housing 7 and the form-fit plate 40 because of the conical region 55 complementary to the circumferential chamfer 56. Since they are complementary to one another, the chamfer 56 and the conical region 55 also achieve a degree of fixing in the horizontal direction, as well as a vertical fixing by the contact between the form-fit plate 40 and the end face 17 of the tightening device 11.

Admittedly, in the case of steel, a break propagation into the air close to the speed of sound takes place, but the starting point of the break can be found in the subsequent forward movement direction of the broken steel piece. Accordingly, relative to the arrangement, the broken steel piece has a horizontal movement component in addition to a vertical one. The additional horizontal fixing by means of the complementarily formed conical region 55 and chamfer 56 prevents a lateral jumping of the tightening device 11. A possible risk of injury to a fitter is reduced.

In the rare case of breakage or snapping of the threaded bolt 1B to be tightened, the suddenly released kinetic energy of the tightening device 11 is transferred by the form-fit plate 40 and the protective arm 32 into the threaded sleeve 31, and hence finally onto the threaded bolt 1C. Since the protective arm 32 has a lower bending strength than the threaded sleeve 31, the protective arm 32—or additionally also the form-fit plate 40—deforms under the impulse, whereby the tightening device 11, the adjacent threaded bolt 1C and/or the threaded sleeve 31 are protected.

In order to ensure access to the drive portion 14 even in the presence of the form-fit plate 40 and protective arm 32, openings 15B, 15A are provided in the form-fit plate 40 and in the protective arm 32 which align with an opening 19 on the end face 17 of the cylinder housing 7. The opening 15A is situated in the protective arm 32 and the opening 15B in the form-fit plate 40.

A slot 34 is formed in the protective arm 32 and extends horizontally from the threaded sleeve 31 in the direction of the tightening device 11. The slot 34 is arranged with its inside in a groove 41 running circumferentially around the threaded sleeve 31. Thus, the threaded sleeve 31 is mounted on the protective arm 32 so as to be rotatable about its longitudinal axis B. This allows centering of the form-fit plate 40 relative to the end face 17 of the cylinder housing 7, with simultaneous screwing of the threaded sleeve 31 onto the threaded bolt 1C. For increased gripping of the threaded sleeve 31 during screwing, it may be advantageous to provide splines or a rubber coating on the outside.

Also, the slot 34 allows a horizontal adjustability of the protective arm 32, whereby the distance Z between the threaded sleeve 31 and the form-fit plate 40 can be adjusted. Thus, the arrangement of the tightening device 11 and safety device 30 is suitable for adaptation to different spacings between the threaded bolts 1A, 1B, 1C.

The groove 41 is formed by the threaded sleeve 31 and an end piece 42 attached at its end on the protective arm side. The upper end of the threaded sleeve 31 forms the lower flank of the groove 41.

The end piece 42 has a cylindrical portion which is partially locked in the threaded sleeve 31. A part of the end piece 42 protruding from the threaded sleeve 31 forms the peripheral base of the groove 41, wherein a further adjacent region of the part of the end piece 42 protruding from the threaded sleeve 31 widens again to the radius of the threaded sleeve 31. The underside of the widened part of the end piece 42 forms the upper flank of the groove 41. Thus, the protective arm 32 is mounted by the end piece 42 so as to be horizontally movable, and in this way is mounted on the threaded sleeve 31 so as to be adjustable in the horizontal direction.

At its side facing away from the threaded sleeve 31, the end piece 42 has a multisided piece on which a tool can be applied. The multisided piece is of the same shape and size as the multisided piece on the drive portion 14, so that the same tool can be applied as is used for tightening the exchangeable bush 12.

To prevent a slippage or turning of the end piece 42 from or into the threaded sleeve 31, the cylindrical portion of the end piece 42 is locked in the threaded sleeve 31 and secured with two grub screws 43. To ensure a force transfer between the end piece 42 and the threaded sleeve 31 on tightening by the above-described tool, or to prevent slipping of the end piece 42 in the threaded sleeve 31, both the threaded sleeve 31 and the end piece 42 have mutually aligning threaded bores 44 in order to create a form fit by means of the grub screw 43.

LIST OF REFERENCE SIGNS

1A Threaded bolt
1B Threaded bolt
1C Threaded bolt
2 Thread end portion
3 Threaded nut
5 First flange
5A Support surface of first flange
6 Second flange
7 Cylinder housing
8 Support tube
11 Tightening device
12 Exchangeable bush
13 Internal thread
14 Drive portion
15A Opening of protective arm
15B Opening of form-fit plate
16 Carrier
17 End face of cylinder housing
18 Gear mechanism
19 Opening of drive portion
20 Hydraulic connection
21 Working chamber
22 Spring
25 Piston
28 Opening
30 Safety device
31 Threaded sleeve
32 Protective arm
33 Internal thread
34 Slot
40 Form-fit plate
41 Groove
42 End piece
43 Grub screw
44 Threaded bore
50 Separating plane
51 Segment
52 Ring
53 Spring element
55 Conical region
56 Chamfer
A Axis of tightening device
B Axis of threaded sleeve
Z Distance

What is claimed is:

1. An arrangement comprising a tightening device (11) for a screw connection and further comprising a safety device (30) assigned to the tightening device (11), wherein the screw connection comprises a threaded bolt (1B) and a threaded nut (3) resting on a support surface (5A), wherein:
the tightening device (11) comprises
a support tube (8) surrounding the threaded nut (3) of the screw connection and resting against the support surface (5A),
a cylinder housing (7) arranged in the extension of the support tube (8),
a hydraulically driven piston (25) arranged in the cylinder housing (7) so as to be moveable along an axis (A),
an exchangeable bush (12) configured to be carried by the piston (25) on the axis (A) and comprising an internal thread (13) for screwing the exchangeable bush (12) to the threaded bolt (1B) of the screw connection,
a carrier (16) arranged rotatably in the support tube (8) and configured to be connected to the threaded nut (3) of the screw connection by force fit or form fit,
wherein the safety device (30) comprises
a threaded sleeve (31) arranged outside the cylinder housing (7) and the support tube (8) and comprising an internal thread (33) configured to engage a threaded bolt (1C) located adjacent to the threaded bolt (1B) of the screw connection, and
a protective arm (32) attached to the threaded sleeve (31) and extending over the cylinder housing (7) of the tightening device (11), wherein the protective arm (32) is attached to the threaded sleeve (31) so as to be adjustable transversely to the axis (A) of the cylinder housing (7);
wherein the threaded sleeve (31) has a circumferential groove (41) configured to receive the protective arm (32) in a transversely movable fashion, wherein the circumferential groove (41) is formed partly by the threaded sleeve (31) and partly by an end piece (42) attached to an end of the threaded sleeve (31) to which the protective arm is connected.

2. The arrangement as claimed in claim 1, wherein the protective arm (32) extends over an end face (17) of the cylinder housing (7) facing away from the support tube (8).

3. The arrangement as claimed in claim 2, wherein the safety device further comprises a form-fit plate (40) connected to the protective arm (32) and adapted to the end face (17) of the cylinder housing (7), wherein the form-fit plate (40) is arranged on the protective arm (32) so as to face the tightening device.

4. The arrangement as claimed in claim 3, wherein the form-fit plate (40) extends over the entire end face (17).

5. The arrangement as claimed in claim 3, wherein the form-fit plate (40) extends only over part of the end face (17).

6. The arrangement as claimed in claim 1, wherein the protective arm (32) has an opening (15A) exposing a drive portion (14) of the tightening device (11).

7. The arrangement as claimed in claim 6, wherein the safety device further comprises a form-fit plate (40) connected to the protective arm (32) and adapted to the end face (17) of the cylinder housing (7), wherein the form-fit plate (40) is arranged on the protective arm (32) so as to face the tightening device, wherein the form-fit plate (40) has an opening (15B) aligned with the opening (15A) of the protective arm (32).

8. The arrangement as claimed in claim 1, wherein the threaded sleeve (31) is rotatable about a longitudinal axis (B) thereof relative to the protective arm (32).

9. The arrangement as claimed in claim 1, wherein the threaded bolt (1C) located adjacent to the threaded bolt (1B) of the screw connection is directly next to the threaded bolt (1B) of the screw connection.

10. The arrangement as claimed in claim 1, wherein the threaded bolt (1C) located adjacent to the threaded bolt (1B)

of the screw connection is not directly next to the threaded bolt (1B) of the screw connection.

11. An arrangement comprising a tightening device (11) for a screw connection and further comprising a safety device (30) assigned to the tightening device (11), wherein the screw connection comprises a threaded bolt (1B) and a threaded nut (3) resting on a support surface (5A), wherein:

the tightening device (11) comprises
- a support tube (8) surrounding the threaded nut (3) of the screw connection and resting against the support surface (5A)
- a cylinder housing (7) arranged in the extension of the support tube (8),
- a hydraulically driven piston (25) arranged in the cylinder housing (7) so as to be moveable along an axis (A),
- an exchangeable bush (12) configured to be carried by the piston (25) on the axis (A) and comprising an internal thread (13) for screwing the exchangeable bush (12) to the threaded bolt (1B) of the screw connection,
- a carrier (16) arranged rotatably in the support tube (8) and configured to be connected to the threaded nut (3) of the screw connection by force fit or form fit, wherein the safety device (30) comprises
- a threaded sleeve (31) arranged outside the cylinder housing (7) and the support tube (8) and comprising an internal thread (33) configured to engage a threaded bolt (1C) located adjacent to the threaded bolt (1B) of the screw connection, and
- a protective arm (32) attached to the threaded sleeve (31) and extending over the cylinder housing (7) of the tightening device (11), wherein the threaded sleeve (31) comprises at least two segments (51) abutting one another in a separating plane (50) and configured to be movable relative to one another between an open position and a closed position, wherein the at least two segments (51) of the threaded sleeve (31) are configured to engage in the closed position the threaded bolt (1C) located adjacent to the threaded bolt (1B) of the screw connection, and wherein the at least two segments (51) of the threaded sleeve (31) are configured to release the threaded bolt (1C) located adjacent to the threaded bolt (1B) of the screw connection in the open position;

wherein the threaded sleeve (31) further comprises a ring (52) configured to lock the at least two segments (51) in the open position or in the closed position, wherein the ring (52) is configured to move in a direction of a longitudinal axis (B) of the threaded sleeve (31).

* * * * *